Patented Jan. 4, 1944

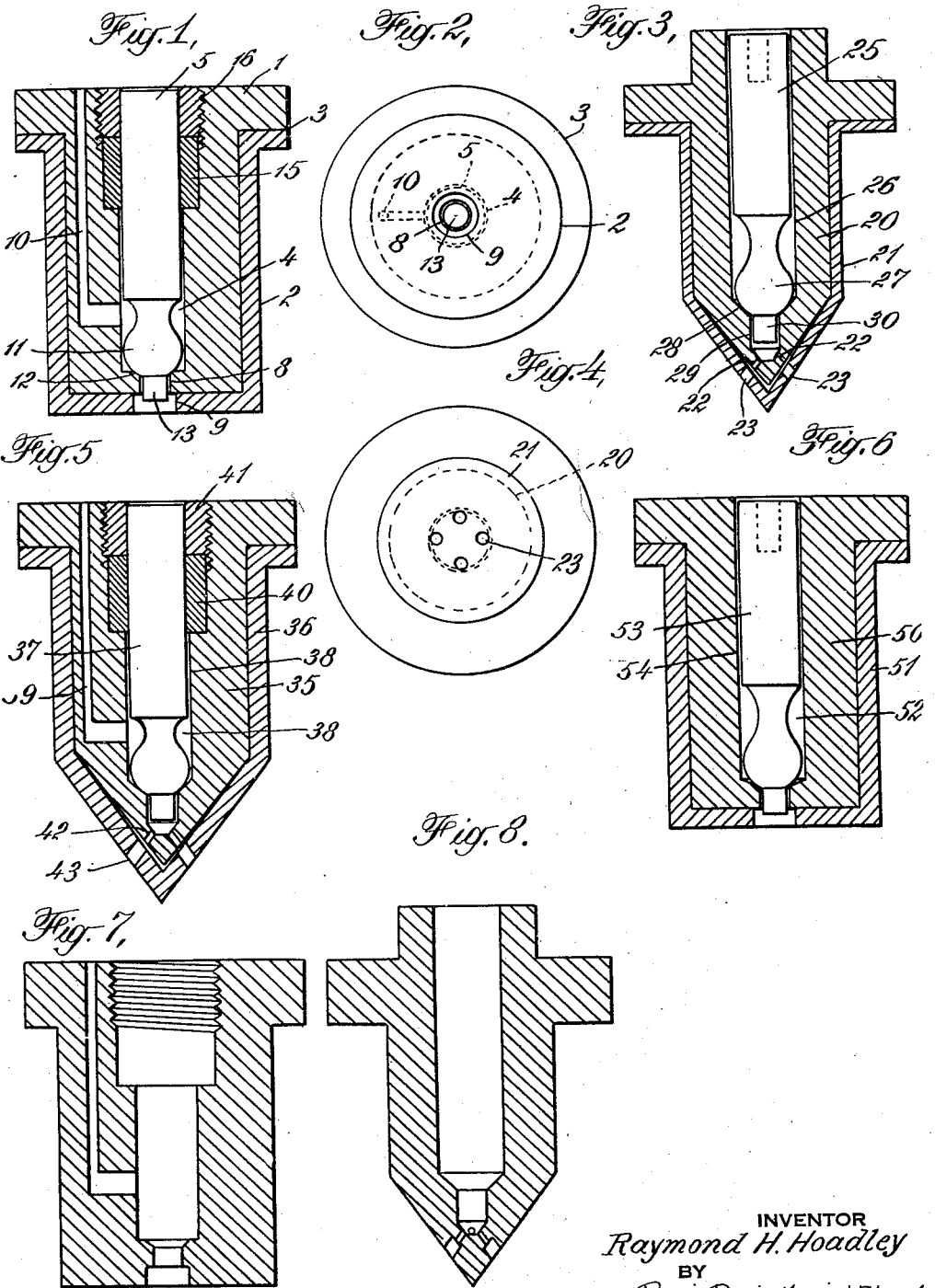

2,338,584

UNITED STATES PATENT OFFICE 2,338,584

INJECTION VALVE

Raymond H. Hoadley, City Island, N. Y.

Application December 28, 1940, Serial No. 372,099

3 Claims. (Cl. 299—107.6)

This invention relates to an injection valve for Diesel engines and has for its object the provision of certain improvements in valves of that character. It is a particular object of the invention to provide an injection valve which may be manufactured at relatively low cost and which will increase the engine efficiency by providing for a better control over the discharge of oil into the engine cylinder.

The invention aims to provide an injection valve constructed and arranged to effect positive seating and to expel substantially all of the oil from the valve as it closes, thereby preventing the dripping of residual oil into the engine cylinder after the valve has closed. In an especially advantageous construction, the valve comprises a valve body having a chamber and a duct communicating with one or more openings or orifices for the discharge of oil from the chamber into the engine, and a valve rod slidable in the chamber having a seating element or member which engages an annular seat in the body. I prefer to use a seat and seating member providing narrow contact such as a seating member of spherical configuration engaging a narrow or flat seat and to provide an extension or plunger on the valve rod having a piston-like fit with the duct to expel the oil from the duct when the valve closes.

In a more or less complete and preferred form of injection valve embodying the invention, the extension or plunger fits into the duct with a loose sliding fit, sufficient clearance being provided to permit the passage of oil through the clearance to the discharge orifice, and the extension also serves as a guide for the valve rod. The orifice or orifices, as the case may be, may be arranged in any suitable manner, for example as holes having uniform diameters throughout their length such as drill holes, or as holes having a large diameter portion on the outside of the body and a small diameter portion on the inside of the body, as described in my Patent 2,068,678. An especially effective orifice according to this invention comprises a single orifice which is merely an extension of the clearance space between the duct and the plunger, whereby a thin cylindrical sheet of oil may be discharged directly into the cylinder.

The valve rod may be actuated in any suitable manner and by means now well known such as cams and the like, or by the pressure of the oil in combination with a spring or other mechanical elements.

The oil injected through the valve is under a very high pressure, for example 3000 pounds per square inch, and it has been the practice heretofore, especially in valves actuated by the oil under pressure, to fit the valve rod into the case with the closest possible fit to prevent leakage of oil past the rod. This has required expensive precision construction which not only contributes to the present high cost of the valves, but the valves are difficult to maintain in operation and their repair often requires the replacement of expensive parts. Ordinarily, repairs are not possible at the time and place needed. This invention contemplates the provision of valve rod packing means to prevent the leakage of oil past the rod which permits the use of a relatively loose fit between the rod and the valve body. Not only are the precision construction and accurate fitting eliminated but the parts do not require repair due to slight wear. The plunger and body are so constructed that a metallic packing is applied to the valve rod to prevent the leakage of oil. The use of metallic packing is especially important in the type of valves in which the plunger is actuated in at least one direction by the oil pressure.

In order to reduce the accumulation of carbon around the outside of the orifices, I have found an arrangement of orifices as described in my said patent to be very advantageous, and I may also form the body herein of two parts, an inner part embracing the chamber formed of wear-resisting metal such as tool steel, and an exterior sheath of a metal having a relatively large coefficient of expansion such as bronze, brass, copper, aluminum and mild steel, or the like. One important advantage of the relatively loosely fitted parts which may be used in this invention is the possibility of forming the entire body of metal having a large coefficient of expansion, for example a metal such as mild steel or any suitable alloy steel. The valves constructed heretofore have had a body portion of metal having a low coefficient of expansion, such as tool steel, because excessive expansion would interfere with the valve operation. The loosely fitted valve rod packed with a metallic packing according to the invention may have a valve body capable of relatively great expansion without interfering with the valve operation.

These and other novel features of the invention will be better understood after considering the following description taken in conjunction with the accompanying drawing, illustrating injection valves embodying the invention, in which:

Fig. 1 is a sectional side view of one form of injection valve;

Fig. 2 is a plan view of Fig. 1;

Fig. 3 is a sectional side view of another form of injection valve;

Fig. 4 is a plan view of Fig. 3;

Fig. 5 is a sectional side view of another form of injection valve;

Fig. 6 is a sectional side view of still another form of injection valve; and

Figs. 7 and 8 are sectional side views of other forms of valve bodies.

The injection valve illustrated in Figs. 1 and 2 comprises a valve body 1 preferably formed of a hard wear-resisting metal such as tool steel, the lower portion of which is surrounded by a sheath 2 formed of a metal having a high coefficient of expansion such as bronze, brass, copper, aluminum, mild steel or the like. The valve body has a flange 3 at the upper end for attachment in the usual way to a cylinder, or the cylinder head of a Diesel engine, the lower end-portion thereof projecting into, or being in communicating contact with the engine cylinder. The central portion of the body is bored out to provide a cylindrical chamber 4 in which the valve rod 5 is slidably mounted. The lower portion of the chamber is integral or contiguous with a duct 8 which also communicates with the larger diameter opening 9 of the sheath 2, and with an oil passage 10 which leads to a fuel pump or other suitable source of oil under a high pressure (not shown).

The rod 5 fits the chamber 4 with a loose sliding fit and the lower end-portion includes a spherical seating element 11 arranged to effect a seating engagement with the narrow annular seat 12 formed in the body 1. The lower end of the rod 5 carries a cylindrical plunger 13 which slides in the duct 8, the clearance therebetween being somewhere in the neighborhood of .003 to .006 of an inch, thereby providing a cylindrical passage for a thin sheet of oil from the chamber 4 through the opening 9 into the engine cylinder. The cylindrical passage thus provided forms a single orifice for the charging of oil into the engine. This single orifice has the advantage that the plunger 13 keeps the clearance free of foreign material by reason of its reciprocating action, and stoppages are practically eliminated.

The oil entering the chamber 4 from the passage 10 is under such a high pressure that it forces the rod 5 upward during each injection and the rod thereafter is forced downward by a spring or other mechanical means well known. In order to prevent, or at least to effectively suppress, passage of any appreciable quantity of oil past the rod 5, I provide a metallic packing 15, which may be formed of a plurality of layers of a material such as high melting point lead packing, or braided copper packing secured in place by means of the packing nut 16. When the packing is tightly compressed around the rod 5 by the packing nut 16, the metal forms a more or less oil impervious mass having the characteristics of solid metal. The closest possible sliding fit can be secured and maintained by adjusting the nut 16. This packing eliminates the necessity of providing a precision fit between the rod 5 and the body 1.

The sheath 2 and relatively large diameter hole 9 serve to prevent any undue accumulation of carbon at the discharge opening in the manner described in my aforementioned patent. In view, however, of the relatively loose sliding fit of the rod 5 permitted by reason of the metallic packing, I may use a valve body formed entirely of metal which has high resistance to wear and a high coefficient of expansion such as that described in connection with Fig. 7.

The injection valve illustrated in Figs. 3 and 4 comprises a valve body 20 and sheath 21 formed of materials such as those described in connection with Fig. 1, but the part of this valve which projects into the engine cylinder is of tapering or conical configuration and is of a type known as a multi-orifice valve in which a plurality of very small metering orifices 22 in the body are arranged to discharge the oil through the larger diameter overlying holes 23 in the sheath 21. The orifices are usually formed by drilling and may vary from .008 to .015 inch in diameter depending upon the horse-power of the engine. The holes 23 may be about one sixteenth of an inch in diameter and are preferably drilled coaxial with the orifices 22. In this form of valve, the valve rod 25 has such ample clearance in the chamber 26 that the oil flows through the clearance from a source of oil under pressure (not shown). The lower end-portion of the rod 25 has a seating element 27 of spherical configuration arranged to effect a seating with the annular sloping surfaces 28 of the body 20. The lower portion of the chamber 26 has a cylindrical contiguous duct 29 communicating with the orifices 22. The rod 25 has a cylindrical extension or plunger 30 which has a loose sliding fit with the duct 29, the clearance being somewhere in the neighborhood between .003 and .006 of an inch so that the oil under pressure in the chamber 26 may flow through the clearance when the rod 25 is raised and the valve open. In this form of the invention, the rod 25 is suitably connected to, or actuated by, any arrangement of mechanical elements such as rocker mechanism, rails, or the like. It is understood that the valve body 20 may be formed of a single piece of metal such as that shown in connection with Fig. 8, thereby eliminating the use of the sheath 21.

The form of injection valve illustrated in Fig. 5 comprises a valve body 35 and sheath 36 similar to that of Fig. 3 and a valve rod 37 mounted with a loose fit in the chamber 38, which chamber communicates by the passage 39 with a source of oil under a high pressure. The rod 37 is provided with a metallic packing 40 and packing nut 41 as described in Fig. 1. In this form of valve, the oil under pressure forces the rod 37 upward and the oil is otherwise discharged through the orifice 42 and larger diameter holes 43 as described in connection with Fig. 3.

The form of valve illustrated in Fig. 6 comprises a valve body 50 and sheath 51 such as described in Fig. 1 having a chamber 52 in which the valve rod 53 is slidable, the space 54 between the rod and chamber being sufficient to permit free passage of oil from the pump into the chamber. The rod, like the rod 25 of Fig. 3, is connected to, and actuated by, any suitable mechanical means, and the oil flows between the ball and annular seat through the duct and discharge opening into the end of the cylinder as described in the description of Fig. 1.

Fig. 7 illustrates a unitary valve body of the type which may be used in the valves of Figs. 1 and 6, the body being formed of any suitable metal such as mild steel having high resistance to wear and such a coefficient of expansion that the expansion and contraction thereof will loosen any deposits of carbon which may accumulate thereon.

The form of valve body illustrated in Fig. 8 is of the form suitable for use in such valves as those illustrated in Figs. 3 and 5 and is formed of the same kind of metal as that described in connection with Fig. 7.

In the improved injection valves of the invention, the narrow annular seat makes possible a positive seating with a minimum of possibility for material to become lodged under the seat. The duct is inside the annular seat as shown in the drawing, thereby eliminating a pocket or trap for the accumulation of foreign matter that would otherwise interfere with the movement of the valve rod. The plunger sliding in the duct has a tendency to break up and force out any foreign matter that may be entrained in the oil.

I claim:

1. A tip member for an injection valve for Diesel engines which comprises a valve body having an inner chamber, a valve rod slidable in the chamber with a relatively loose fit, a metallic packing in cooperating engagement with the body and the valve rod, said metallic packing providing a precision fit for the valve rod, thereby guiding the valve rod and preventing a leakage of oil from the chamber, an annular valve seat in the valve body, a seating member on the valve rod arranged to coact with the seat, at least one of the seating surfaces being convex, whereby a very narrow positive seating contact is provided, the valve rod being movable in one direction to press the seating member into closing engagement with the seat and movable in the opposite direction to remove the seating member from the seat, a duct in the valve body contiguous with the chamber, at least one orifice in the valve body for discharging oil into the engine communicating with the duct, a plunger on the rod having a loose sliding fit with the duct, said duct, rod, orifice, and plunger being so constructed and arranged that as the valve rod moves to bring the seating member into engagement with the seat the plunger expels substantially all of the oil from the duct, thereby preventing a drip of residual oil into the engine after the injection of oil has stopped.

2. A tip member for an injection valve for Diesel engines of the type having a valve rod actuated to open the valve by the pressure of the fuel oil and other means for closing the valve which comprises a body in which the valve rod is slidable with a loose fit, said body being insertable through the engine into the combustion space, metallic packing in cooperating engagement with the body and the valve rod to prevent appreciable leakage of oil past the valve rod, whereby precision forming of the rod and the coacting surface of the body is unnecessary.

3. An improved tip member for an injection valve for Diesel engines which comprises a valve body having a chamber and contiguous duct, a valve rod slidable in the chamber with a relatively loose fit, a metallic packing in cooperating engagement with the body and the valve rod, said metallic packing providing a precision fit for the valve rod, thereby guiding the valve rod and preventing leakage of oil from the chamber, an annular seat in the valve body spaced from the duct, a convex seating member actuated by the valve rod and arranged to engage the seat with a narrow contact and prevent the passage of oil from the chamber to the duct, a plunger on the valve rod and slidable in the duct, the clearance between the duct and the plunger being sufficient to serve as an orifice, whereby oil from the chamber is ejected through the clearance when the valve is open.

RAYMOND H. HOADLEY.